US006487551B2

(12) United States Patent
Dong et al.

(10) Patent No.: US 6,487,551 B2
(45) Date of Patent: *Nov. 26, 2002

(54) EXTERNALIZING VERY LARGE OBJECTS IN A RELATIONAL DATABASE CLIENT/SERVER ENVIRONMENT (75) Inventors: Margaret Ann Dong, San Jose, CA (US); James W. Pickel, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/836,078

(22) Filed: Apr. 16, 2001

(65) Prior Publication Data

US 2001/0023420 A1 Sep. 20, 2001

Related U.S. Application Data (63) Continuation-in-part of application No. 09/160,011, filed on Sep. 24, 1998, now Pat. No. 6,256,626.

(51) Int. Cl.[7] .......................... G06F 17/30; G06F 15/00
(52) U.S. Cl. ............................. 707/3; 707/4; 707/516
(58) Field of Search .......................... 707/1–5, 500, 707/516, 526, 100–103, 501; 709/201–203, 331–332; 345/10, 700, 661, 666, 619–625, 655, 681–682

(56) References Cited

U.S. PATENT DOCUMENTS

| 5,566,329 | A | | 10/1996 | Gainer et al. |
|---|---|---|---|---|
| 5,604,899 | A | | 2/1997 | Doktor |
| 5,611,076 | A | | 3/1997 | Durflinger et al. |
| 5,652,882 | A | | 7/1997 | Doktor |
| 5,689,698 | A | | 11/1997 | Jones et al. |
| 5,727,197 | A | | 3/1998 | Burgess et al. |
| 5,732,402 | A | | 3/1998 | Lehman |
| 6,012,067 | A | * | 1/2000 | Sarkar .............................. 703/3 |
| 6,021,426 | A | * | 2/2000 | Douglis et al. ................ 705/26 |
| 6,085,223 | A | * | 7/2000 | Carino et al. .................. 707/10 |
| 6,256,626 | B1 | * | 7/2001 | Dong et al. ....................... 707/3 |

FOREIGN PATENT DOCUMENTS

| EP | 0 603 880 A2 | 6/1994 |
|---|---|---|
| EP | 0 772 139 A2 | 5/1997 |
| JP | 6-161843 | 6/1994 |
| JP | 10-11464 | 1/1998 |

OTHER PUBLICATIONS

IBM Technical Disclosure Bulletin, "Method for Storing Large Objects in a Relational Database," 35(4A):72–75, Sep. 1992.
IBM Technical Disclosure Bulletin, "Segmented Relational Database Tables," 38(07):219–220, Jul. 1995.
IBM Technical Disclosure Bulletin, "Mapping a Relational Database toa Hierarchical File System," 38(10):309–311, Oct. 1995.
Rennhackkamp, M., "Extending Relational DBMSs," DBMS. Tools & Strategies for IS Professionals, 10(13):45–51,Dec. 1997.

* cited by examiner

Primary Examiner—Alford W. Kindred
(74) Attorney, Agent, or Firm—Gates & Cooper LLP (57) ABSTRACT The present invention discloses a method, apparatus, and article of manufacture for transmitting data having non-standard data types between computers. A query is executed to retrieve data from a database. The database comprises data having standard data types and data having non-standard data types and is stored on a data storage device connected to a server computer. At the server computer, data having standard data types, small non-standard data types, and large non-standard data types is retrieved. An answer set is generated that comprises data having standard data types, small non-standard data types, and one or more placeholders representing data having the large non-standard data types. The generated answer set is transmitted to a client computer. After transmitting the generated answer set, data represented by each placeholder in the answer set is transmitted to the client computer.

33 Claims, 8 Drawing Sheets

FIG. 5

EXTERNALIZING VERY LARGE OBJECTS IN A RELATIONAL DATABASE CLIENT/SERVER ENVIRONMENT

CROSS-REFERENCE TO RELATED APPLICATION

This application is a continuation-in-part of the following and commonly-assigned patent application Ser. No. 09/160,011, entitled "EXTERNALIZING VERY LARGE OBJECTS IN A RELATIONAL DATABASE CLIENT/SERVER ENVIRONMENT," filed Sep. 24, 1998, by Margaret A. Dong and James W. Pickel, now U.S. Pat. No. 6,256,626, issued Jul. 3, 2001, which application is incorporated by reference herein.

BACKGROUND OF THE INVENTION

1. Field of the Invention

This invention relates in general to computer-implemented database management systems, and, in particular, to efficiently transmitting very large objects in a client/server environment.

2. Description of Related Art

Database management systems (DBMSs) are computerized information storage and retrieval systems. Relational database management systems (RDBMSs) are DBMSs that store and retrieve data that are organized as tables. A table consists of rows and columns of data. The rows are formally called tuples. A database will typically have many tables and each table will typically have multiple tuples and multiple columns.

DBMSs are frequently designed to store data having a variety of data types. With the recent developments in object technology, there is a push to incorporate object technology into a distributed relational database environment. For instance, a DBMS may have the capability of storing and retrieving data having standard data types, such as integers and characters, as well as non-standard data types, including very large data objects (LOBs). A typical DBMS represents text, voice, and image data as LOB types. Various applications and systems use data having LOB types. Exemplary applications and systems may involve multimedia applications for the World Wide Web; medical care applications (e.g., X-rays, MRI imaging, and EKG traces); and geographical, space, and exploration systems (e.g., maps, seismic data, and satellite images).

In conventional client-server systems, client applications reside on the client computer, and server applications reside on the server computer. Client computers and server computers are connected with a communication line (network), such as a local area network (LAN). The server computer may contain a DBMS and may be connected with one or more databases. A common client-server scenario involves a client application on the client computer requesting data (e.g., in the form of a database query) from a database on the server computer. The DBMS on the server computer processes the query to, retrieve data from the database. The retrieved data can include LOB data (i.e., data having a LOB data type).

Transmitting LOB data over a network generally consumes a large amount of bandwidth and may significantly impact the performance of the network, the database, and/or applications involved in fetching the LOB data from the database.

For instance, in response to a query from an application, the client computer contacts the server computer. The response to the query may contain LOB data. The current approach to returning the response to the client computer generally involves returning a row of data having both standard and non-standard data types. An exemplary row may have columns 1, 2, and 3, with columns 1 and 3 containing data having standard data types(e.g., integers or characters). Column 2 could contain data having a non-standard data type (e.g., LOB data that consumes two megabytes of space in a data storage device). When a row containing these three columns is transmitted from the server computer to the client computer, data is typically transmitted sequentially. Therefore, the client computer first receives the column 1 data having a standard database data type, receives the column 2 data having a non-standard data type, and then receives the column 3 data having a standard database data type. These columns of data are typically stored in a temporary storage location and then moved to the application's storage. Because the LOB data in column 2 is large in size, additional time and/or temporary storage space is required to receive the column 2 data.

Processing typically used for handling standard data columns, which are defined by small volumes of data, may be inefficient when the data columns are defined by larger volumes of data. Thus, there is a need for a technique of realizing efficiencies throughout the processing of non-standard data columns, such as when moving data into the application's storage.

SUMMARY OF THE INVENTION

To overcome the limitations in the prior art described above, and to overcome other limitations that will become apparent upon reading and understanding the present specification, the present invention discloses a method, apparatus, and article of manufacture for transmitting data having non-standard data types between computers.

In accordance with the present invention, a query is executed to retrieve data from a database. The database comprises data having standard data types, data having small non-standard data types, and data having large non-standard data types, and is stored on a data storage device connected to a server computer. At the server computer, data having standard and non-standard data types is retrieved. An answer set is generated that comprises data having standard data types, data having small non-standard data types, and one or more placeholders, wherein each placeholder represents data having large non-standard data types. The generated answer set is transmitted to a client computer. After transmitting the generated answer set, data represented by each placeholder in the answer set is transmitted to the client computer.

An objective of an embodiment of the present invention is to separate data having large non-standard data types from data having standard data types and data having small non-standard data types, when transmitting data between a client and server computer. A further objective of an embodiment of the present invention is to allow either the client or server computer to control the quantity of large non-standard data types received at the client computer 102 when the answer set contains multiple rows (commonly referred to as a block of rows). Another object of an embodiment of the present invention is to optimize data movement at various stages in the processing.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
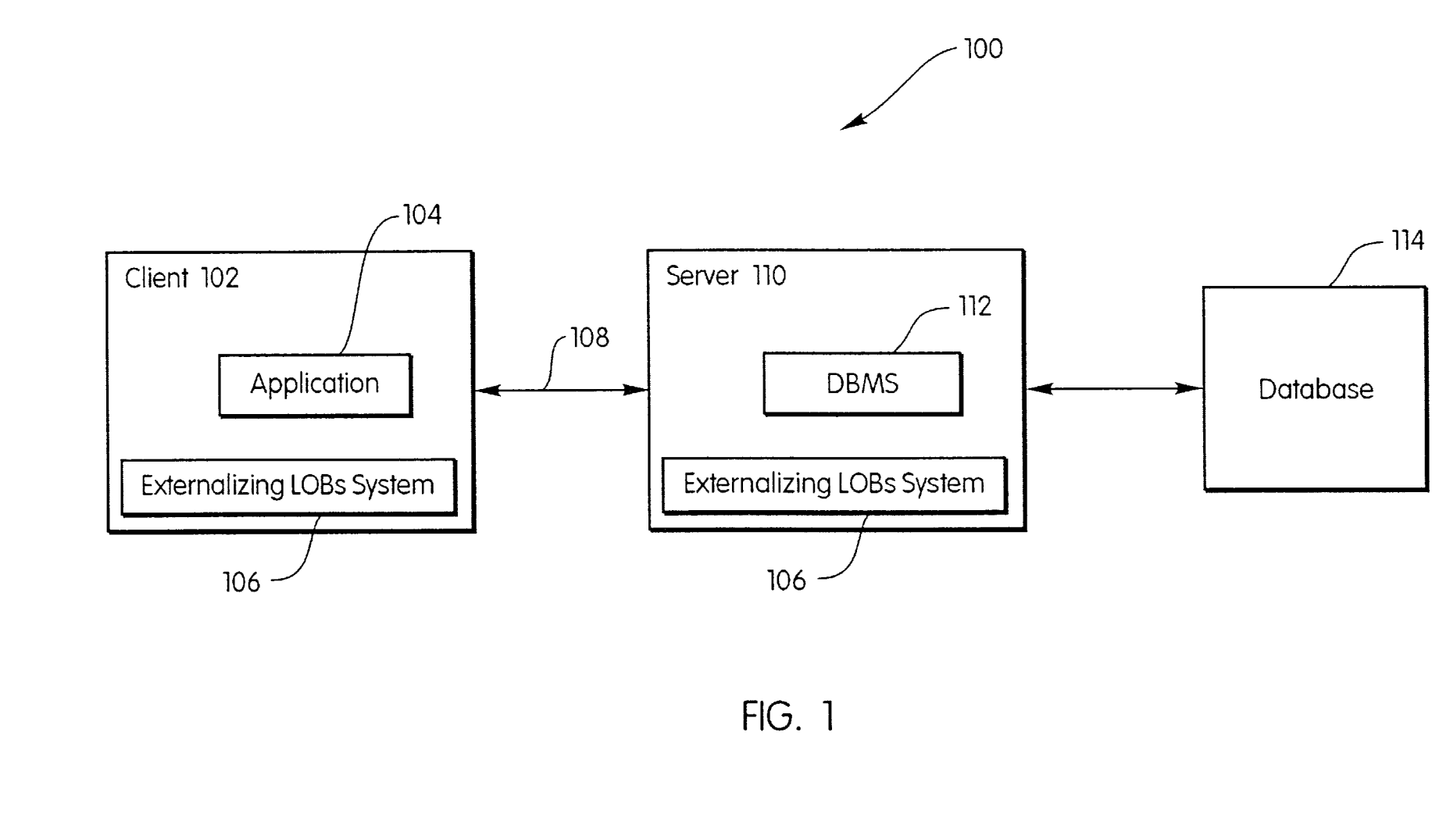
FIG. 1 represents an exemplary client-server configuration that could be used in accordance with the present invention.

FIG. 1 represents an exemplary client-server configuration 100 that could be used in accordance with the present invention. The client and server use a predefined protocol to communicate with each other, such as the Distributed Relational Database Architecture (DRDA). A client computer 102 receives a database query from an application 104. The externalizing LOBs system 106 allows the client computer 102 to control the quantity of non-standard data types received at the client computer 102 when the answer set contains multiple rows. A network or communication line 108 connects the client computer 102 to a server computer 110. The client computer 102 sends the application's query over the network 108 to the server computer 110. The server computer 110 transmits the application's query to the DBMS 112.

The DBMS 112 performs the query to retrieve data from the database 114. The database 114 is stored on data storage devices (e.g., fixed or hard disk drives, floppy disk drives, CDROM drives, a tape drives, or other devices) connected to the server computer 110. A database response to a query can contain data having standard data types and non-standard data types. Standard data types include characters and integers. Non-standard data types include LOBs, wherein the non-standard data types are further classified into "small" non-standard data types (e.g., small LOBs) and "large" non-standard data types (e.g., large LOBs).

In one embodiment, small non-standard data types are non-standard data types<=32 k bytes and large non-standard data types are non-standard datatypes>32 k bytes. In another embodiment, small non-standard data types are non-standard data types that are smaller than or equal to the largest standard data type, and large non-standard data types are non-standard data types that are larger than the largest standard data type. Of course, those skilled in the art will recognize that other methods and sizes could be used to classify non-standard data types into small and large non-standard data types.

The DBMS 112 generates a query answer set from the data retrieved from the database. The query answer set contains data having standard data types, data having small non-standard data types, and/or placeholders that represent data having large non-standard data types. The placeholders take the place of data having large non-standard data types in an answer set row. Namely, a one-to-one correspondence exists between the placeholders in the base data object and between the materialized data having large non-standard data types in the externalized data object that are to be returned to the client computer 102. The server computer 110 transmits the query answer set over the network 108 to the client computer 102 and then transmits data represented by the placeholders to the client computer 102.

Figure 2:
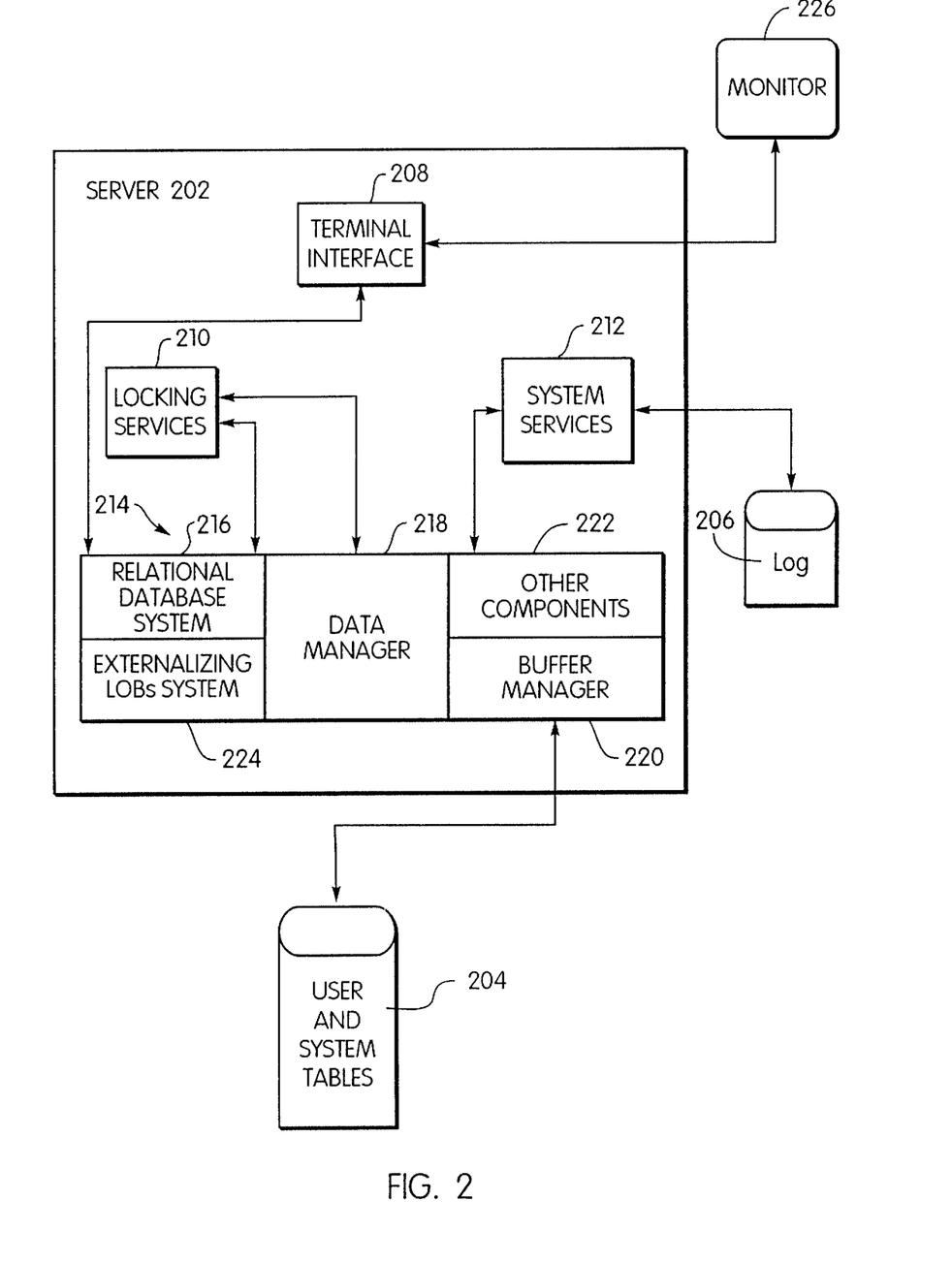
FIG. 2 illustrates a server hardware environment that could be used in accordance with the present invention.

FIG. 2 illustrates an exemplary server computer 202 hardware environment that could be used in accordance with the present invention. In the exemplary environment, a server computer 202 (see 110 in FIG. 1) is comprised of one or more processors connected to one or more data storage devices 204 and 206 that store one or more relational databases, such as a fixed or hard disk drive, a floppy disk drive, a CDROM drive, a tape drive, or other device.

An application 104 on the client computer 102 can access the database 114 using a standard operator interface 208, such as IMS/DB/DC®, CICS®, TSO®, OS/390®, ODBC® or other similar interface, to transmit electrical signals to the server computer 202. These electrical signals represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the MVS® or OS/390® operating systems. Those skilled in the art will recognize, however, that the present invention has application program to any RDBMS software, whether or not the RDBMS software uses SQL.

As illustrated in FIG. 2, the DB2® system for the MVSO operating system includes three major components: the Internal Resource Lock Manager (IRLM) 210, the Systems Services module 212, and the Database Services module 214. The IRLM 210 handles locking services for the DB2® system, which treats data as a shared resource, thereby allowing any number of users to access the same data simultaneously. Thus concurrency control is required to isolate users and to maintain data integrity. The Systems Services module 212 controls the overall DB2® execution environment, including managing log data sets 206, gathering statistics, handling startup and shutdown, and providing management support.

At the center of the DB2® system is the Database Services module 214. The Database Services module 214 contains several submodules, including the Relational Database System (RDS) 216, the Data Manager 218, the Buffer Manager 220, the Externalizing LOBs System 224 (see 106 in FIG. 1), and other components 222 such as an SQL compiler/interpreter. These submodules support the functions of the SQL language, i.e. definition, access control, interpretation, compilation, database retrieval, and update of user and system data. The Externalizing LOBs System 224 works in conjunction with the other submodules to efficiently transmit large LOBs from the server computer 202 to a client computer 102.

The present invention is generally implemented using SQL statements executed under the control of the Database Services module 214. The Database Services module 214 retrieves or receives the SQL statements, wherein the SQL statements are generally stored in a text file on the data storage devices 204 and 206 or are transmitted to the server computer system 202 from the client computer 102. The Database Services module 214 then derives or synthesizes instructions from the SQL statements for execution by the server computer system 202.

Generally, the RDBMS software, the SQL statements, and the instructions derived therefrom, are all tangibly embodied in a computer-readable medium, e.g. one or more of the data storage devices 204 and 206. Moreover, the RDBMS software, the SQL statements, and the instructions derived therefrom, are all comprised of instructions which, when read and executed by the server computer system 202, causes the server computer system 202 to perform the steps necessary to implement and/or use the present invention. Under control of an operating system, the RDBMS software, the SQL statements, and the instructions derived therefrom, may be loaded from the data storage devices 204 and 206 into a memory of the server computer system 202 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environments illustrated in FIG. 1 and FIG. 2 are not intended to limit the present invention. Indeed, those skilled in the art will recognize that other alternative hardware environments may be used without departing from the scope of the present invention.

Externalizing LOBs System

The preferred embodiment of the invention provides an externalizing LOBs system 106. Referring to FIG. 1, the externalizing LOBs system 106 provides an efficient approach to sending and receiving data having large non-standard data types in a client-server environment. In particular, by separating data having standard data types and data having small non-standard data types from data having large non-standard data types, the externalizing LOB system 106 externalizes the data having large non-standard data types (i.e., large LOBs) from the data having standard data types and the data having small non-standard data types (i.e., small LOBs).

The method described in the parent application Ser. No. 09/160,011, U.S. Pat. No. 6,256,626 B1, entitled "EXTERNALIZING VERY LARGE OBJECTS IN A RELATIONAL DATABASE CLIENT/SERVER ENVIRONMENT," filed Sep. 24, 1998, by Margaret A. Dong and James W. Pickel, now U.S. Pat. No. 6,256,626, issued Jul. 3, 2001, which is incorporated by reference herein, is optimized for all data having non-standard data types, regardless of their size. However, for small non-standard data types, the method of the parent application generally increases the processing requirements, because of the additional overhead to process the placeholder and to send and receive the LOBs outside of a generated answer set. The present invention refines this method to include small non-standard data types with the answer set, instead of generating an answer set including the placeholder, and after transmitting the generated answer set, transmitting the non-standard data type represented by the placeholder in the answer set. The present invention thus allows the processing of data having small non-standard data types (small LOBs) to perform the same as standard data types, and externalizing only data having large non-standard data types (large LOBs).

The server computer 110 receives a query from the client computer 102. This query is initially structured by an application 104. The server computer 110 then transmits the query to the DBMS 112. The DBMS 112 retrieves data from the database 114 and returns a response to the server computer 110. The response (or answer set) contains zero or more rows that satisfy the query. Each row contains ordered columns. Each column of data can have different data types, including integer, character, small non-standard data types, and/or large non-standard data types, wherein the non-standard data types may comprise a LOB. A LOB is a Large OBject type that can be defined in any column within a row. Additionally, multiple columns in a row may contain LOB data.

In a client/server environment, each fetch request is sent from the client computer 102 to the server computer 110. A server computer 110 typically responds to fetch requests using a predefined protocol, such as a DRDA single-row fetch protocol or a DRDA limited block fetch protocol. Those skilled in the art will recognize that the DRDA protocols discussed herein are not intended to limit the present invention. Indeed, those skilled in the art will recognize that other alternative protocols may be used without departing from the scope of the present invention.

For the single-row fetch protocol, each request returns either zero rows or 1 row of the answer set. The limited block fetch protocol returns zero to N rows of the answer set for each request. The variable N is the number of rows that can fit into a query block. A query block is a buffer that contains the formatted rows of the answer set. The client computer 102 and the server computer 110 may negotiate the buffer size. The answer set rows may be returned to the client computer 102 as a data object.

Figure 3:
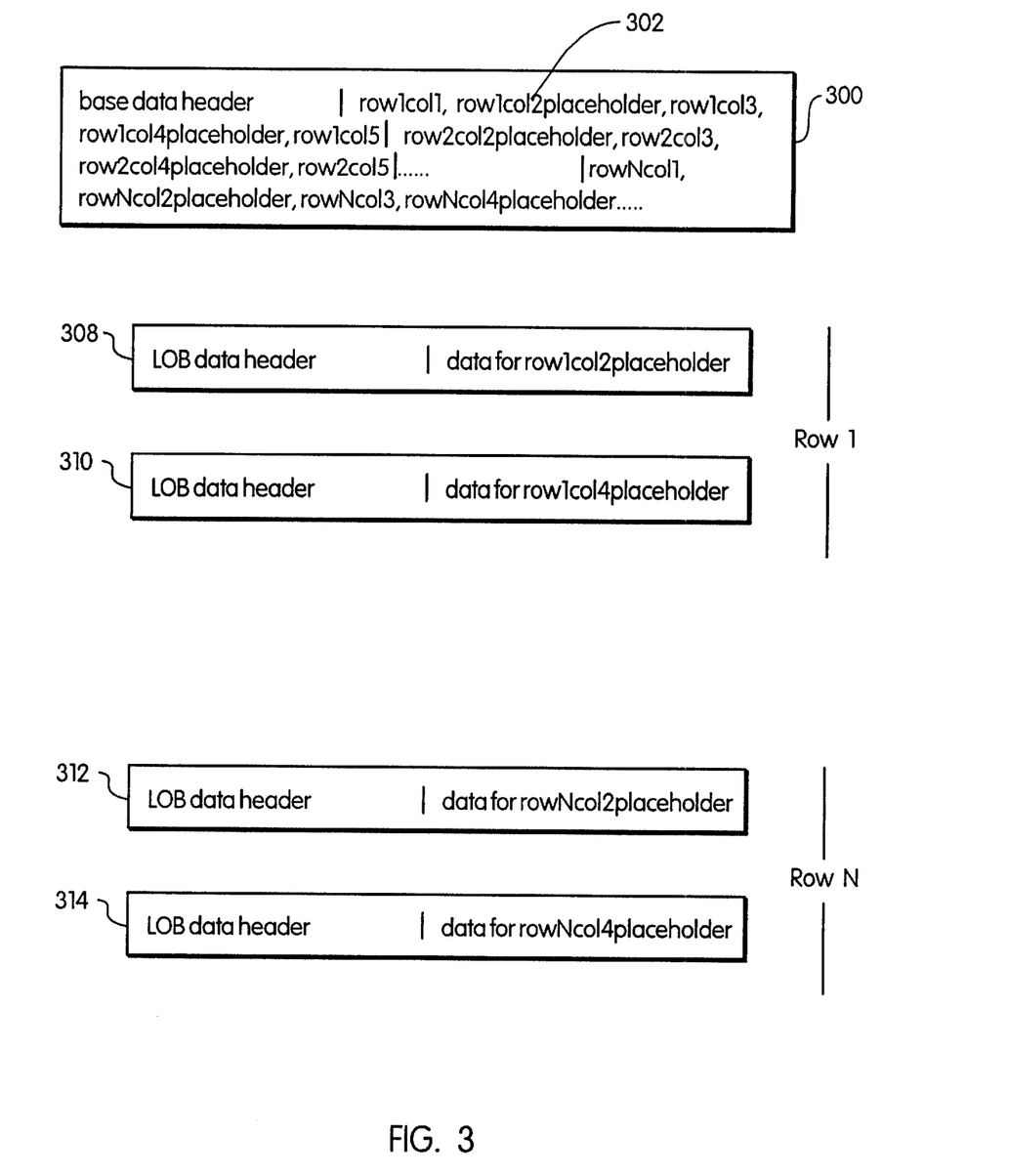
FIG. 3 illustrates exemplary base data objects and externalized data objects in accordance with the present invention.

The externalizing LOBs system 106 uses the data in the answer set to generate a response to be returned to the client computer 102. Specifically, the externalizing LOBs system 106 separates the standard and non-standard data types into two types of data objects. The first data object (or base data object) contains a base data header, standard data types, small non-standard data types, and/or placeholders that represent large non-standard data types. FIG. 3 shows an exemplary base data object 300. In the base data object 300, the placeholders take the place of large non-standard data types in a row. For example, in FIG. 3, a placeholder represented by the string "row1col2placeholder" 302 holds the place of the large non-standard data types in the second column of the first row.

The second data object (or externalized data object) contains a LOB data header and the data represented in a placeholder. The ordering of the externalized data objects 304, 306, 308, and 310 matches the ordering of the placeholders in the base data object 300. Externalized data objects 304, 306, 308, and 310, are represented in FIG. 3. The externalized data objects 304 and 306 are associated with row 1 of the base data object 300. The externalized data objects 308 and 310 are associated with row N of the base data object 300. The variable N represents the number of complete rows in the base data object 300.

The technique of separating large LOB data into externalized data objects can readily be extended, to sending input data from a client computer 102 to a server computer 110. An alternative embodiment involves a base data object that contains input data columns that are standard data types, small non-standard data types, and/or placeholders representing large nonstandard data types. The server computer 110 can receive and process the base data object in a manner easily understood from the client processing described above. Likewise, this technique also applies to non-query (non-cursor-related processing), where a SQL SELECT request is sent from the client computer 102 to a server computer 10 and one row is returned. The client computer 102 can receive and process the base data object in a manner easily understood from the client processing described above.

FIGS. 4A–4D are flow diagrams illustrating the steps performed by the client computer 102 and the server computer 110 in accordance with the externalizing LOBs system 106. The steps performed by the client computer 102 are represented on the left side of the figure. The steps performed by the server computer 110 are represented on the right side of figure. These figures show query processing using the DRDA limited block fetch protocol.

Figure 4A:
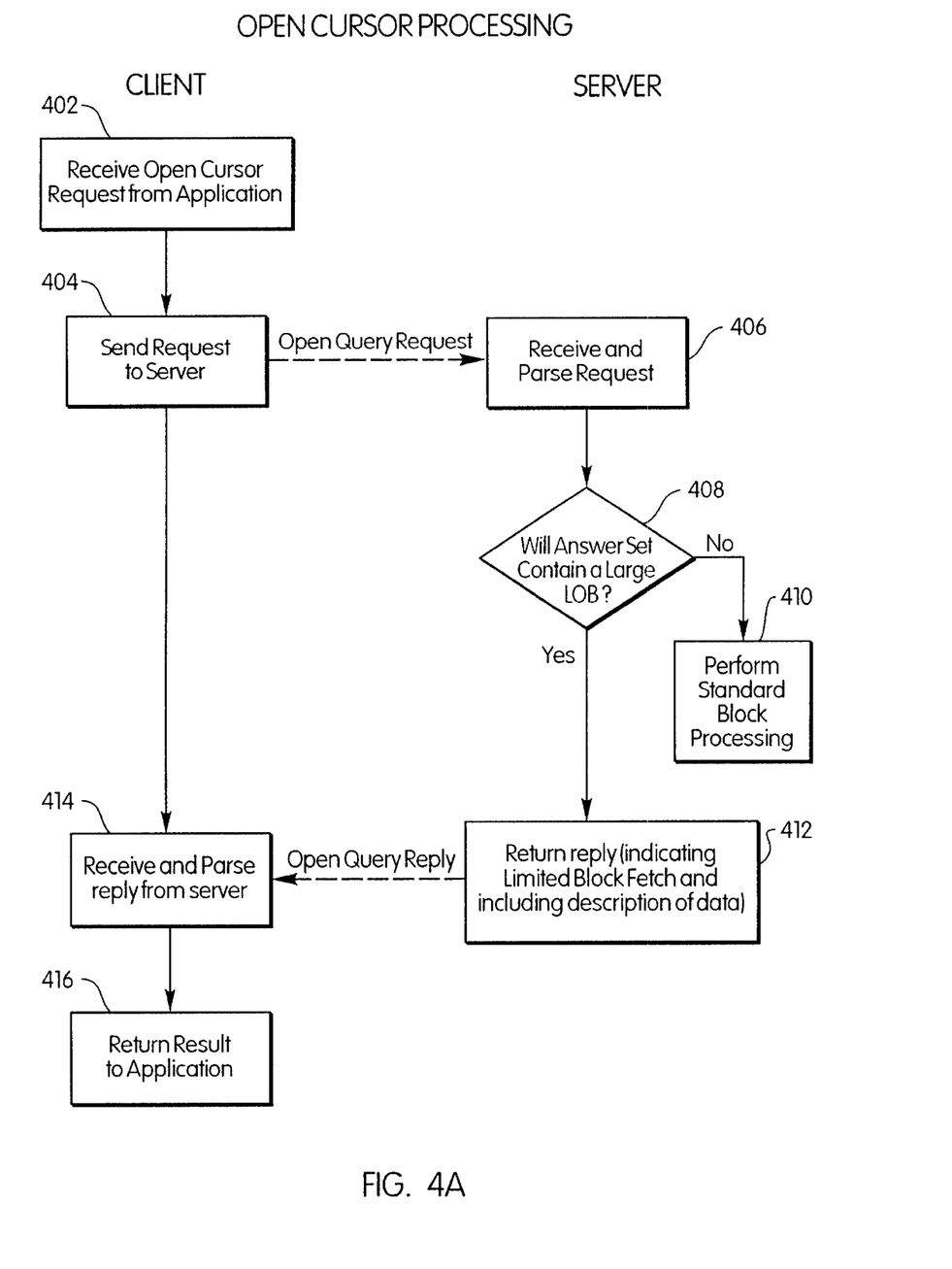
FIGS. 4A–4D are flow diagrams illustrating the steps performed by the client computer and the server computer in accordance with the present invention.

FIG. 4A illustrates the SQL OPEN CURSOR processing. Block 402 represents the client computer 102 receiving an SQL OPEN CURSOR request from the application 104. Block 404 represents the client computer 102 sending the Application 104's request to the server computer 110. The application 104's request is commonly referred to as an OPEN QUERY request. The client computer 102 may send other information with the OPEN QUERY request. Such information may include instructions about the fetch protocol.

Block 406 represents the server computer 110 receiving the OPEN QUERY request and parsing the request. At this time, the server computer 110 can choose a fetch protocol, unless the client computer 102 sent instructions to use a predefined fetch protocol, e.g., DRDA single row fetch protocol. In the preferred embodiment of the invention, the server computer 110 chooses the limited block fetch protocol. However, use of the limited block fetch protocol is not intended to limit the present invention. Indeed, the requirements of the query dictate whether the limited block fetch protocol can be chosen or not.

Block 408 is a decision block that represents the server computer 110 ascertaining whether the database response (answer set) will contain large LOBs. If the response does not contain large LOBs then, the server computer proceeds to block 410. Block 410 represents the server computer performing standard block processing. Otherwise, if the response contains large LOBs, the server computer proceeds to block 412.

Block 412 represents the server computer 110 returning a reply to the client computer 102. The reply is commonly referred to as an OPEN QUERY REPLY message. The reply may include a description of the database response. The description of the data contains information such as: column 1 is an integer; column 2 is a small LOB; column 3 is a large LOB; etc. The description could also include an indication of whether the large LOB data will be returned as externalized data objects. The reply may also contain other information, including which fetch protocol (e.g., DRDA single row fetch protocol or DRDA limited block fetch protocol) will be used.

Block 414 represents the client computer receiving and parsing the reply. Block 416 represents the client computer 102 returning the result to the application 104.

Figure 4B:
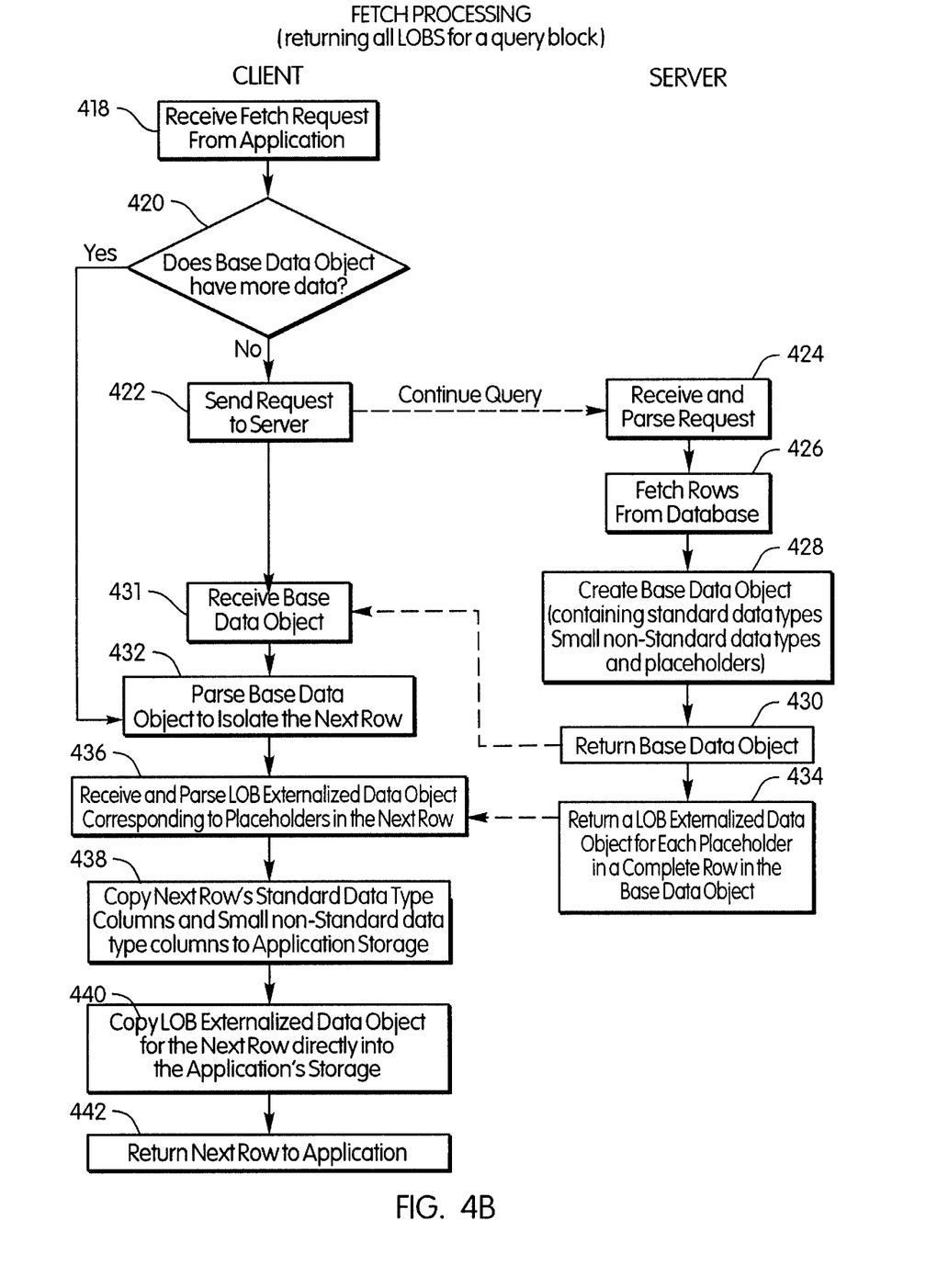

FIG. 4B illustrates fetch processing when the client computer 102 has requested that all large LOBs for a query block be returned with the query block. Block 418 represents the client computer 102 receiving a SQL FETCH request from the application 104. Block 420 is a decision block that represents the client computer 102 determining whether all the returned data in the base data object 300 has been passed to the application 104. If the base data object 300 still has data to return to the application 104, then the client computer 102 proceeds to block 432. Otherwise, the client computer 102 proceeds to block 422.

Block 422 represents the client computer 102 sending a request for the next row to the server computer 110. This request is commonly referred to as a CONTINUE QUERY request. Block 424 represents the server computer receiving and parsing the request. The server computer 110 then fetches rows from the database according to the DRDA limited block fetch protocol, as represented by block 426. Block 428 represents the server computer 110 using the database response (or answer set) to create a base data object 300. The base data object 300 contains column data for standard data types, column data for small non-standard data types, and/or placeholders for column data of large non-standard data types. Block 430 represents the server computer 110 returning the base data object 300 to the client computer 102.

Block 431 represents the client computer 102 receiving the data object 300. Block 432 represents the client computer 102 parsing the data object 300 to isolate the column data and placeholders belonging to the next row. Block 434 represents the server computer 110 returning a large LOB externalized data object 308, 310, through 312 and 314, each large LOB object corresponding to a placeholder contained within a complete row in the base data object 300. Block 436 represents the client computer 102 receiving and parsing the externalized data object 308 and 310, corresponding to each placeholder in the next row.

The next row's standard data type columns and small non-standard data type columns are copied to the application 104's storage, as represented by block 438. Block 440 represents the client computer 102 copying the large LOB externalized data object 308, 310, 312, or 314 for the next row directly into the application 104's storage. Block 442 represents the client computer 102 returning the next row to the application 104.

Figure 4C:
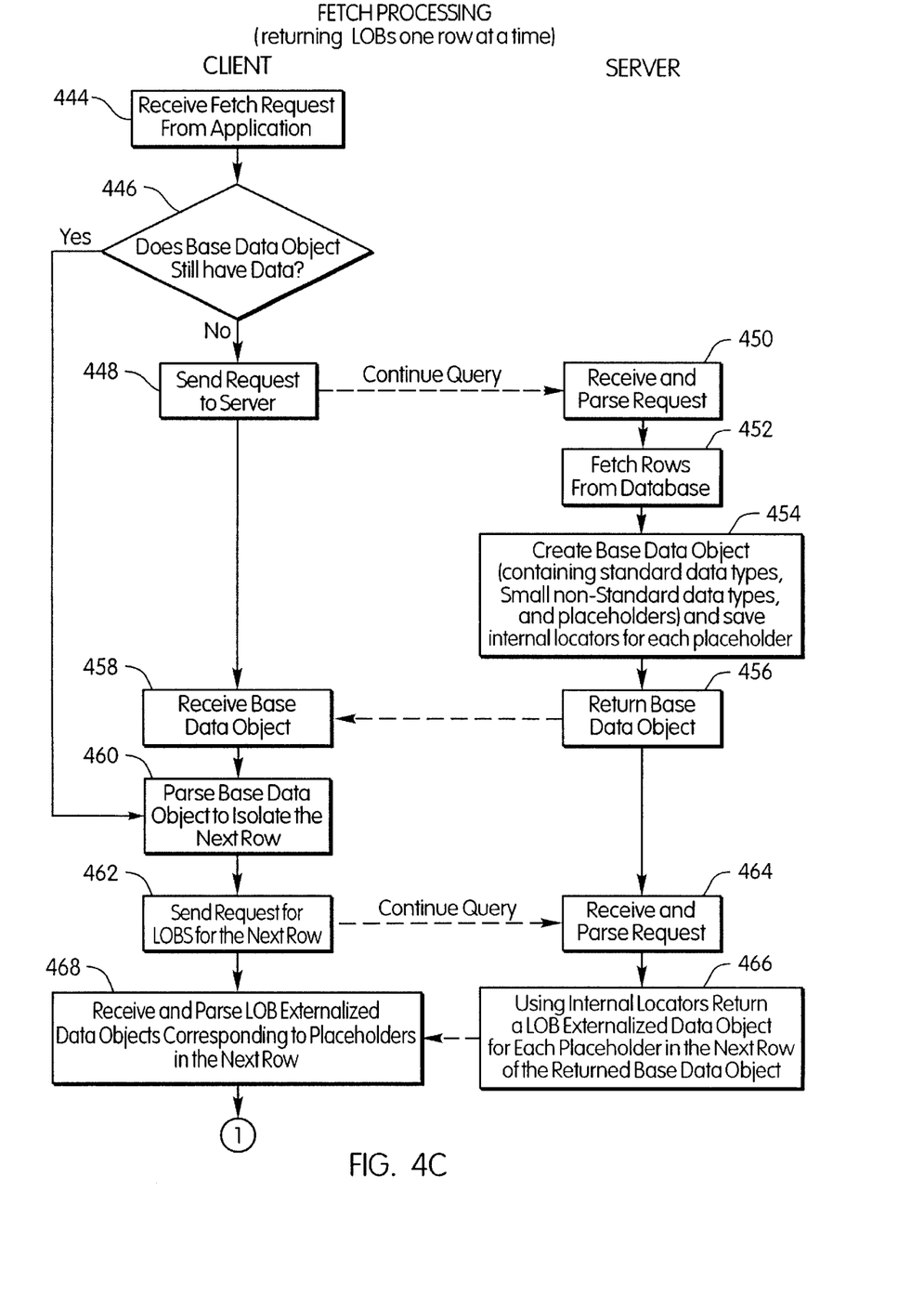

FIG. 4C illustrates fetch processing when returning large LOBs one row at a time. Block 444 represents the client computer 102 receiving a fetch request from the application 104. Block 446 is a decision block that represents the client computer 102 determining whether the base data object 300 still has data to be returned to the application. If the base data object 300 still has data, then the client computer 102 proceeds to block 460. Otherwise, the client computer proceeds to block 448.

Block 448 represents the client computer sending a request to the server computer. This request is commonly referred to as a CONTINUE QUERY request. Block 450 represents the server computer receiving and parsing the request. The server computer 110 then fetches rows from the database according to DRDA limited block fetch protocol specifications, as represented by block 452. Block 454 represents the server computer 110 using the database response (or answer set) to create a base data object 300. The server computer 110 also saves internal locators for each placeholder in the base data object 300, as represented by block 454. The base data object 300 contains column data for standard data types, column data for small non-standard data types, and/or placeholders for columns having large non-standard data types. Block 456 represents the server computer 110 returning the base data object 300 to the client computer 102. Block 458 represents the client computer 102 receiving the base data object 300. The base data object 300 is then parsed to isolate the column data and placeholders belonging to the next row, as represented by block 460.

Block 462 represents the client computer sending a request to the server computer 110 for the next row. Block 464 represents the server computer receiving and parsing the request. The server computer 110 uses the internal locators to locate a large LOB, as represented by block 466. The server computer 110 then returns the externalized data object 308 or 310 to the client computer 102.

Figure 4D:
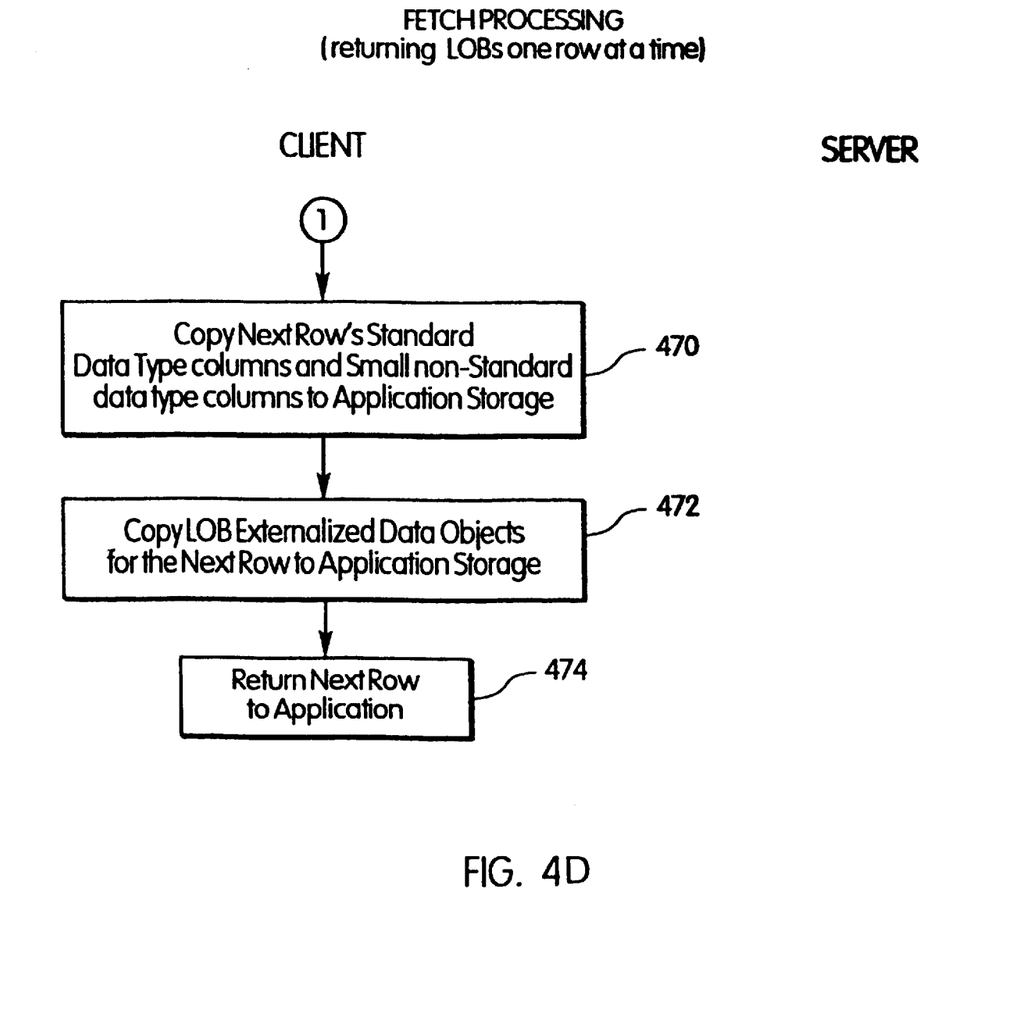

Block 468 represents the client computer 102 receiving and parsing the externalized data objects 308 and 310 that correspond to the placeholders in the next row. In FIG. 4D, block 470 represents the client computer 102 copying the next row's standard data type columns and small non-standard data type columns to the application 104's storage. Block 472 represents the client computer 102 copying the externalized data objects 308 and 310 to the application 104's storage. Block 474 represents the client computer 102 returning the next row to the application.

Figure 5:
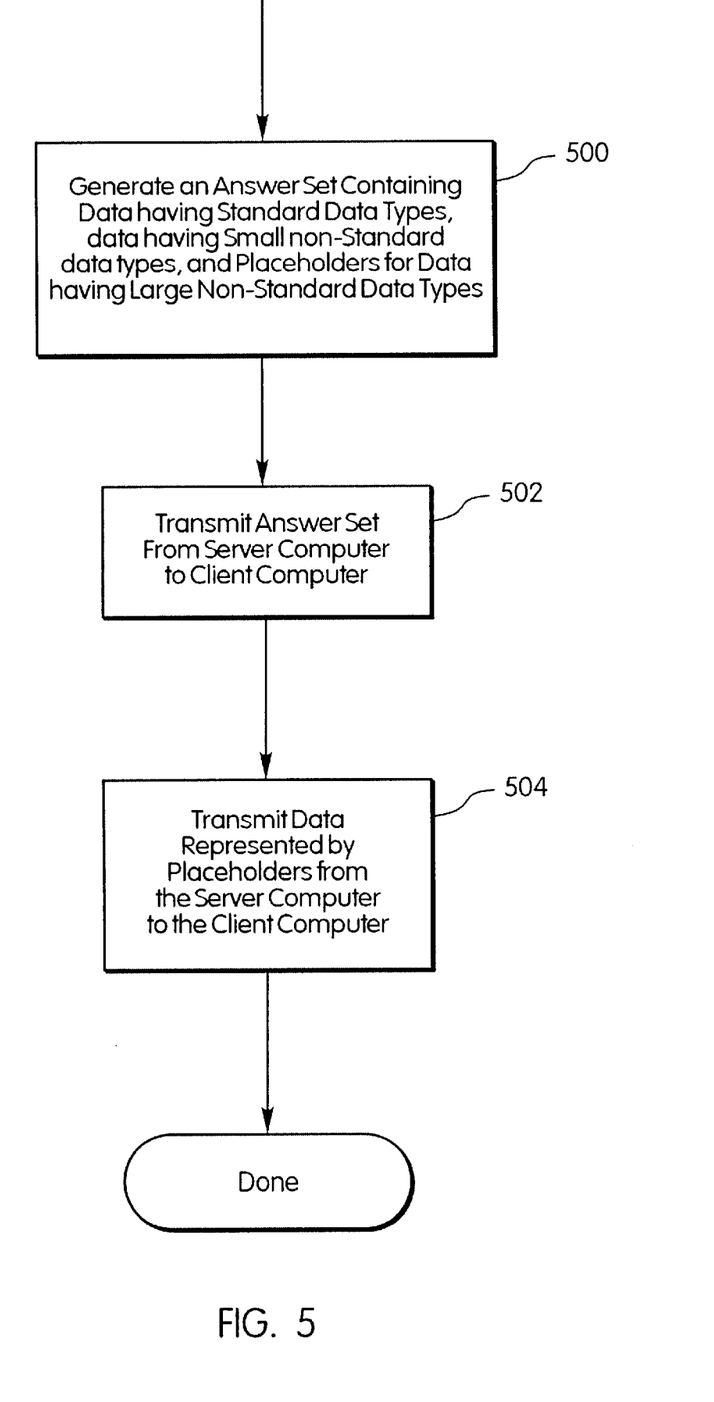
FIG. 5 is a flow diagram illustrating the steps performed by the externalizing LOBs system in accordance with the present invention.

FIG. 5 is a flow diagram illustrating the steps performed by the externalizing LOBs system 106 in accordance with the present invention. Block 500 represents the externalizing LOBs system 106 generating an answer set containing data having standard data types, data having small non-standard data types, and/or placeholders for data having large non-standard data types. Block 502 represents the externalizing LOBs system 106 transmitting the answer set from the server computer to the client computer. Block 504 represents the externalizing LOBs system 106 transmitting data represented by the placeholders from the server computer to the client computer.

The technique of separating data having large non-standard data types into externalized data objects can readily be extended to sending input data from a client computer 102 to a server computer 110. An alternative embodiment involves a base data object that contain input data columns that are standard data types, columns that are small non-standard data types, and/or placeholders representing large non-standard data types. The server computer 110 can receive and process the base data object in a manner easily understood from the client processing described above. Likewise, this technique also applies to non-query (non-cursor-related processing), where a SQL SELECT request is sent from the client computer 102 to a server computer 110 and one row is returned. The client computer 102 can receive and process the base data object in a manner easily understood from the client processing described above.

Conclusion

This concludes the description of the preferred embodiment of the invention. The following describes some alternative embodiments for accomplishing the externalizing LOBs system 106. For example, any type of computer, such as a mainframe, minicomputer, or personal computer, or computer configuration, such as a timesharing mainframe, local area network, or standalone personal computer, could be used with embodiments of the externalizing LOBs system 106.

In summary, a preferred embodiment of the externalizing LOBs system 106 separates large LOBs from a query answer set, while keeping small LOBs with the query answer set, and then efficiently transmitting large LOBs from a server computer to a client computer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for executing a query to retrieve data from a database, the database comprising data having at least one standard data type and data having at least one non-standard data type and being stored on a data storage device connected to a server computer, the method comprising the steps of:

at the server computer, retrieving data having a standard data type, a small non-standard data type, and a large non-standard data type from the database;

generating an answer set comprising data having the standard data types, the small non-standard data types, and a placeholder, wherein the placeholder represents data having the large non-standard data types;

transmitting the generated answer set comprising at least the placeholder to a client computer; and         after transmitting the generated answer se transmitting data having the large non-standard data type represented by the placeholder in the answer set to the client computer.

2. The method of claim 1, wherein the non-standard data types are large object (LOB) data types.

3. The method of clam 1, wherein the small non-standard data types are less than or equal to 32 k bytes and the large non-standard data types are greater than 32 k bytes.

4. The method of claim 1, wherein the small non-standard data types are less than or equal to a largest of the standard data types and the large non-standard data types are greater than the largest of the standard data types.

5. The method of claim 1, wherein the step of transmitting data represented by each placeholder comprises transmitting the data represented by each placeholder one row at a time.

6. The method of claim 1, wherein the answer set is partitioned into at least one block of rows and wherein the step of transmitting the answer set to the client computer comprises separately transmitting each block of rows.

7. The method of claim 6, further comprising the steps of:

at the server computer, receiving data from an application residing on the client computer; and         inputting the received data into the database.

8. An apparatus for executing a query to retrieve data from a database, comprising:

a server computer having a data storage device connected thereto, wherein the data storage device stores a database and wherein the database comprises data having at least one standard data type and data having at least one non-standard data type;
one or more computer programs, performed by the server computer, for, at the server computer, retrieving data having a standard data type, a small non-standard data type, and a large non-standard data type from the database, generating an answer set comprising data having the standard data type, data having the small non-standard data type, and a placeholder representing data having a large non-standard data type, transmitting the generated answer set comprising at least the placeholder to a client computer, and, after transmitting the generated answer set, transmitting data represented by the placeholder in the answer set to the client computer.

9. The apparatus of claim 8, wherein the non-standard data types are large object (LOB) data types.

10. The apparatus of claim 8, wherein the small non-standard data types are less than or equal to 32 k bytes and the large non-standard data types are greater tan 32 k bytes.

11. The apparatus of claim 8, wherein the small non-standard data types are less than or equal to a largest of the standard data types and the large non-standard data types are greater than the largest of the standard data types.

12. The apparatus of claim 11, wherein the means for transmitting data represented by each placeholder comprises transmit the data represented by each placeholder one row at a time.

13. The apparatus of claim 11, wherein the answer set is partitioned into at least one block of rows and wherein the means for transmitting the answer set to the client computer comprises separately transmitting each block of rows.

14. The apparatus of claim 13, the apparatus further comprising one or more computer programs, performed by the server computer for receiving data from an application residing on the client computer, and inputting the received data into the database.

15. An article of manufacture comprising a computer program carrier readable by a computer and embodying one or more instructions executable by the computer to perform method steps for executing a query to retrieve data from a database, the database comprising data having at least one standard data type and data having at least one non-standard data type and being stored on a data storage device connected to a server computer, the method comprising the steps of:
at the server computer,
retrieving data having a standard data type, a small non-standard data type, and a large non-standard data type from the database;
generating an answer set comprising data having the standard data type, the small non-standard data type, and a placeholder representing data having the large non-standard data type;
transmitting the generated answer set comprising at least the placeholder to a client computer; and
after transmitting the generated answer set, transmitting data having the large non-standard data type represented by the placeholder in the answer set to the client computer.

16. The article of manufacture of claim 15, wherein the non-standard data types are large object (LOB) data types.

17. The article of manufacture of claim 15, wherein the small non-standard data types are less than or equal to 32 k bytes and the large non-standard data types are greater than 32 k bytes.

18. The article of manufacture of claim 15, wherein the small non-standard data types are less than or equal to a largest of the standard data types and the large non-standard data types are greater than the largest of the standard data types.

19. The article of manufacture of claim 18, wherein the step of transmitting data represented by each placeholder comprises transmitting the data represented by each placeholder one row at a time.

20. The article of manufacture of claim 18, wherein the answer set is partitioned into at least one block of rows and wherein the step of transmitting the answer set to the client computer comprises separately transmitting each block of rows.

21. The article of manufacture of claim 20, further comprising the steps of: at the server computer,
receiving data from an application residing on the client computer; and
inputting the received data into the database.

22. A method for executing a query to retrieve data from a database, the database comprising data having at least one non-standard data type and being stored on a data storage device connected to a server computer, the method comprising the steps of:
at the server computer,
retrieving data having a small non-standard data type and a large non-standard data type from the database;
generating an answer set comprising data having the small non-standard data types and a placeholder, wherein the placeholder represents data having the large non-standard data types;
transmitting the generated answer set comprising at least the placeholder to a client computer; and
after transmitting the generated answer set, transmitting data having the large non-standard data type represented by the placeholder in the answer set to the client computer.

23. The method of claim 22, wherein the non-standard data types are large object (LOB) data types.

24. The method of claim 22, wherein the small non-standard data types are less than or equal to 32 k bytes and the large non-standard data types are greater than 32 k bytes.

25. The method of claim 22, wherein the small non-standard data types are less than or equal to a largest of the standard data types and the large non-standard data types are greater than the largest of the standard data types.

26. An apparatus for executing a query retrieve data from a database, comprising:
a server computer having a data storage device connected thereto, wherein the data storage device stores a database and wherein the database comprises data having at least one standard data type and data having at least one non-standard data type;
one or more computer programs, performed by the server computer, for, at the server computer, retrieving data having a small non-standard data type and a large non-standard data type from the database, generating an answer set comprising data having the small non-standard data types and a placeholder, wherein the placeholder represents data having the large non-standard data types, transmitting the generated answer set comprising at least the placeholder to a client computer, and after transmitting the generated answer set, transmitting data having the large non-standard data type represented by the placeholder in the answer set to the client computer.

27. The apparatus of claim 26, wherein the non-standard data types are large object (LOB) data types.

28. The apparatus of claim 26, wherein the small non-standard data types are less than or equal to 32 k bytes and the large non-standard data types are greater tin 32 k bytes.

29. The apparatus of claim 26, wherein the stall non-standard data types are less than or equal to a largest of the standard data types and the large non-standard data types are greater than the largest of the standard data types.

30. An article of manufacture comprising a computer program carrier readable by a computer and embodying one or more instructions executable by the computer to perform method steps for executing a query to retrieve data from a database, the database comprising data having at least one standard data type and data having at least one non-standard data type and being stored on a data storage device connected to a server computer, the method comprising the steps of:

at the server computer,
retrieving data having a small non-standard data type and a large non-standard data type from the database;
generating an answer set comprising data having the small non-standard data types and a placeholder, wherein the placeholder represents data having the large non-standard data types;
transmitting the generated answer set comprising at least the placeholder to a client computer; and
after transmitting the generated answer set, transmitting data having the large non-standard data type represented by the placeholder in the answer set to the client computer.

31. The article of manufacture of claim 30, wherein the non-standard data types are large object (LOB) data types.

32. The article of manufacture of claim 30, wherein the small non-standard data types are less than or equal to 32 k bytes and the large non-standard data types are greater than 32 k bytes.

33. The article of manufacture of claim 30, wherein the small non-standard data types are less than or equal to a largest of the standard data types and the large non-standard data types are greater than the largest of the standard data types.

* * * * *

UNITED STATES PATENT AND TRADEMARK OFFICE
CERTIFICATE OF CORRECTION

PATENT NO. : 6,487,551 B2
DATED : November 26, 2002
INVENTOR(S) : Margaret Ann Dong and James W. Pickel It is certified that error appears in the above-identified patent and that said Letters Patent is hereby corrected as shown below:

Column 10,
Line 39, "se" should read -- set, --

Column 11,
Line 26, "transmit" should read -- transmitting --

Column 12,
Line 67, "tin" should read -- than --

Column 13,
Line 1, "stall" should read -- small --

Signed and Sealed this

Fifth Day of August, 2003

JAMES E. ROGAN
*Director of the United States Patent and Trademark Office*